Figure 6:
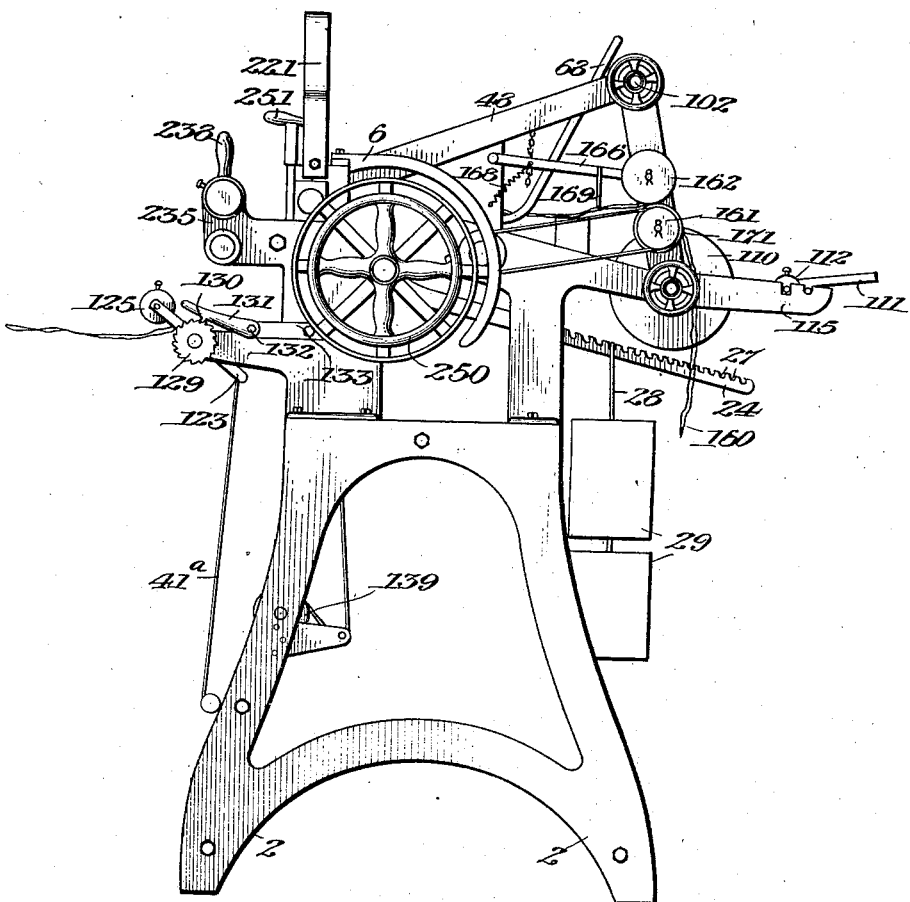

J. A. FIRSCHING.
CUTTING, FOLDING, AND WINDING MACHINE.
APPLICATION FILED MAY 23, 1912.
1,088,138.
Patented Feb. 24, 1914.
7 SHEETS—SHEET 1.
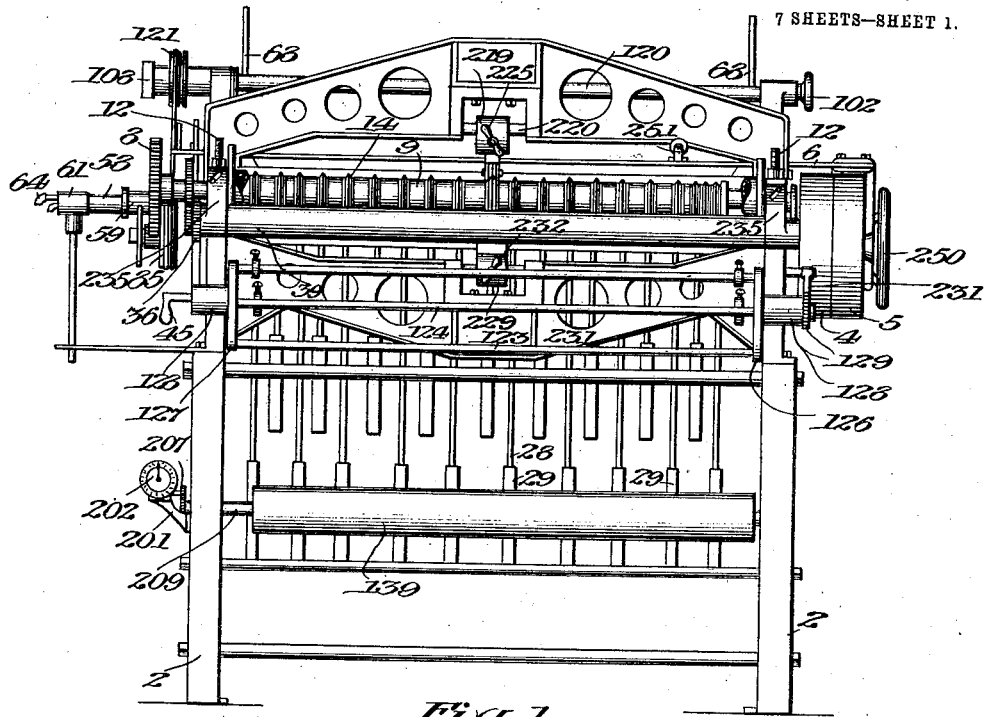
Fig. 1.
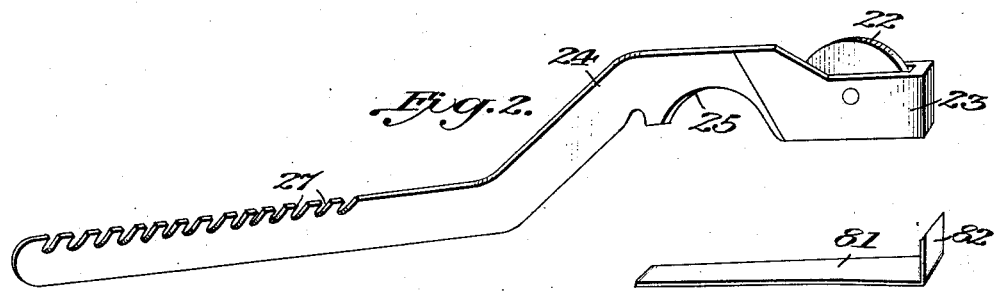
Fig. 2.
Fig. 3.
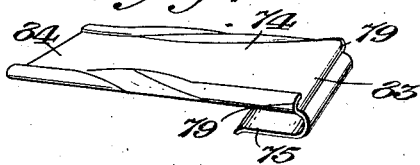
Fig. 4.
Fig. 5.
Witnesses:
Inventor:
JOSEPH A. FIRSCHING
BY Thomas L. Wilder
ATTORNEY J. A. FIRSCHING.
CUTTING, FOLDING, AND WINDING MACHINE.
APPLICATION FILED MAY 23, 1912.

1,088,138.

Patented Feb. 24, 1914.
7 SHEETS—SHEET 2.

Witnesses:
David B. Lisle
Samuel Sloan

Inventor:
JOSEPH A. FIRSCHING
BY Thomas L. Wilder
ATTORNEY

J. A. FIRSCHING.
CUTTING, FOLDING, AND WINDING MACHINE.
APPLICATION FILED MAY 23, 1912.

1,088,138.

Patented Feb. 24, 1914.

7 SHEETS—SHEET 3.

Witnesses:
David B. Lisle
Samuel Sloan

Inventor:
JOSEPH A. FIRSCHING
BY Thomas L. Wilder
ATTORNEY

J. A. FIRSCHING.
CUTTING, FOLDING, AND WINDING MACHINE.
APPLICATION FILED MAY 23, 1912.

1,088,138.

Patented Feb. 24, 1914.

7 SHEETS—SHEET 4.

Witnesses

Inventor:
JOSEPH A. FIRSCHING
BY Thomas L. Wilder
ATTORNEY

J. A. FIRSCHING.
CUTTING, FOLDING, AND WINDING MACHINE.
APPLICATION FILED MAY 23, 1912.

1,088,138.

Patented Feb. 24, 1914.

7 SHEETS—SHEET 5.

Witnesses:
David B. Lisle
Samuel Sloan

Inventor:
JOSEPH A. FIRSCHING
BY Thomas L. Wilder
ATTORNEY

J. A. FIRSCHING.
CUTTING, FOLDING, AND WINDING MACHINE.
APPLICATION FILED MAY 23, 1912.
1,088,138.
Patented Feb. 24, 1914.
7 SHEETS—SHEET 6.
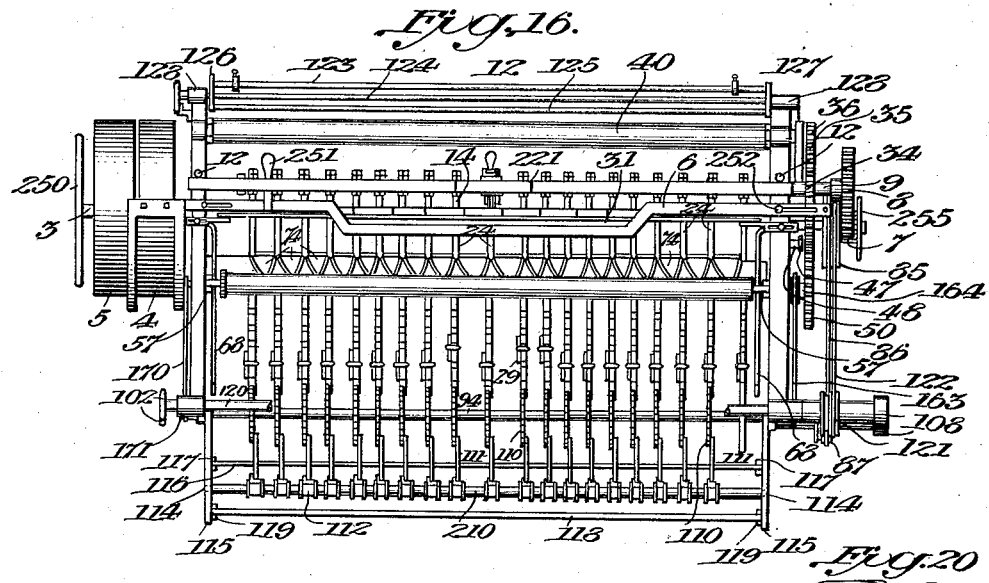
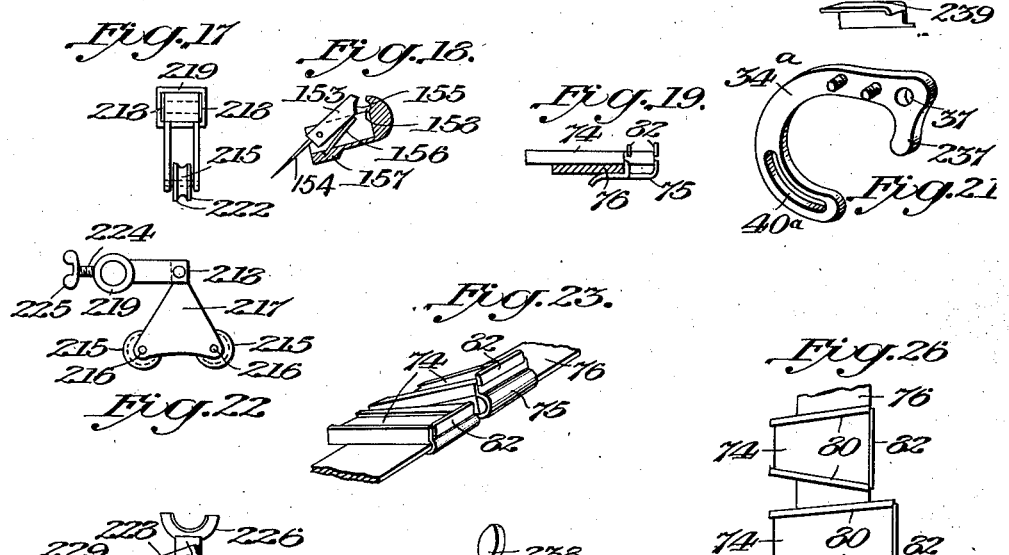
Witnesses:
David B. Lisle
Samuel Sloan
Inventor:
JOSEPH A. FIRSCHING
BY Thomas L. Wilder
ATTORNEY J. A. FIRSCHING.
CUTTING, FOLDING, AND WINDING MACHINE.
APPLICATION FILED MAY 23, 1912.

1,088,138.

Patented Feb. 24, 1914.

7 SHEETS—SHEET 7.

Witnesses:
David B. Lisle
Samuel Sloan

Inventor:
JOSEPH A. FIRSCHING
BY Thomas L. Wilder
ATTORNEY

UNITED STATES PATENT OFFICE.

JOSEPH A. FIRSCHING, OF UTICA, NEW YORK.

CUTTING, FOLDING, AND WINDING MACHINE.

1,088,138.  Specification of Letters Patent.  Patented Feb. 24, 1914.

Application filed May 23, 1912. Serial No. 699,316.

*To all whom it may concern:*

Be it known that I, JOSEPH A. FIRSCHING, a citizen of the United States, residing at Utica, in the county of Oneida and State of New York, have invented a new and useful Improvement in Cutting, Folding, and Winding Machines, of which the following is a specification.

My invention relates to a cutting, folding and winding machine, and I declare the following to be a full, clear, concise and exact description thereof, sufficient to enable anyone skilled in the art to which it appertains to make and use the same, reference being had to the accompanying drawings, in which like reference characters refer to like parts throughout the specification.

The object of the invention is to provide a simple efficient device adapted to convert a roll of cloth into a plurality of strips for use in facing undergarments and similar articles.

The machine involves a plurality of cutting knives coöperating with a like number of wheels adjustably held with reference to said knives by toggles having means for suspending adjustable weights.

Furthermore, the machine embodies folding plates adapted to symmetrically fold the lateral edges of the strips as same are evolved from the knives.

There is also comprised, means for winding the strips after same have undergone the cutting and folding processes.

The machine further comprises a measuring device, whereby the length of cloth fed to the machine may be determined at any given moment.

Figure 7:
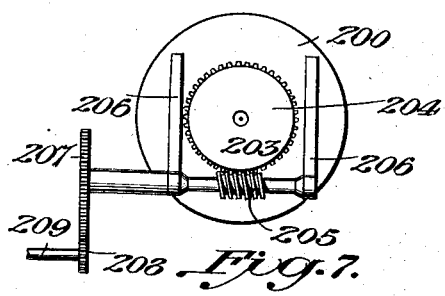
Figure 8:
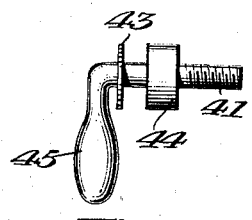
Figure 9:
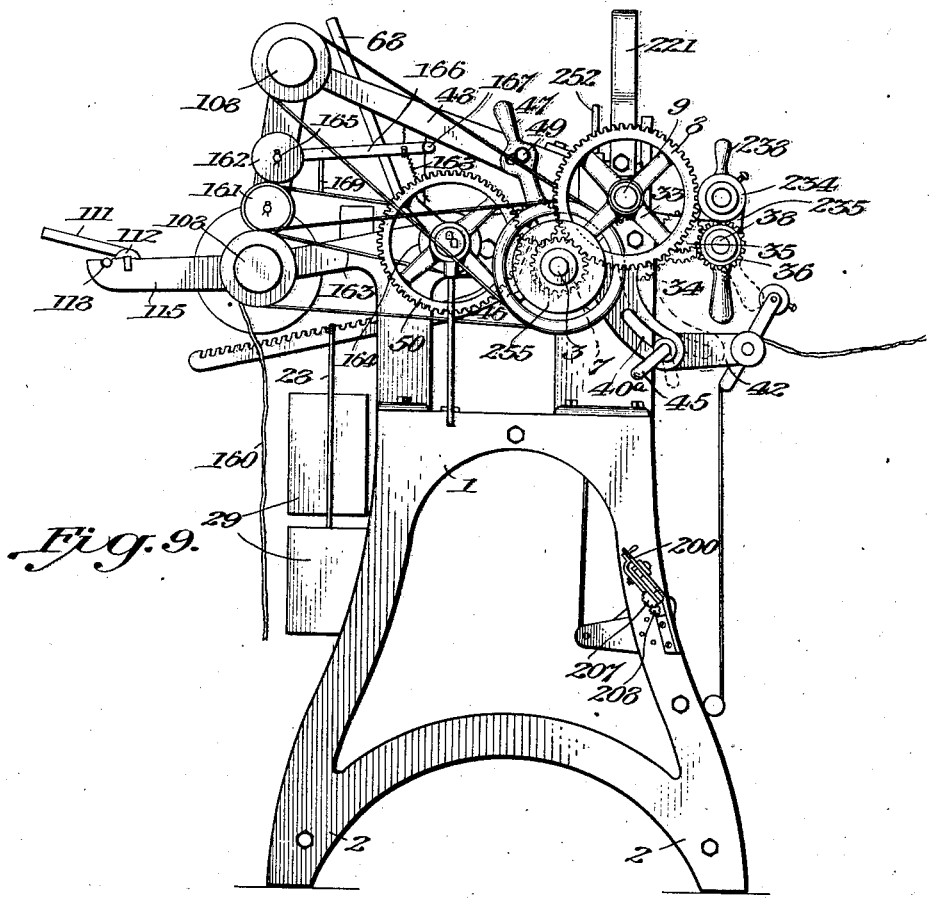
Figure 10:
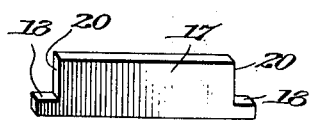
Figure 11:
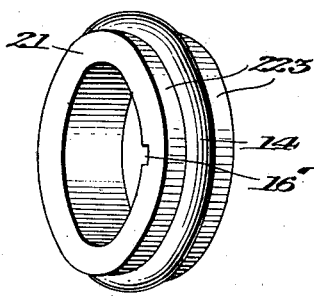
Figure 12:
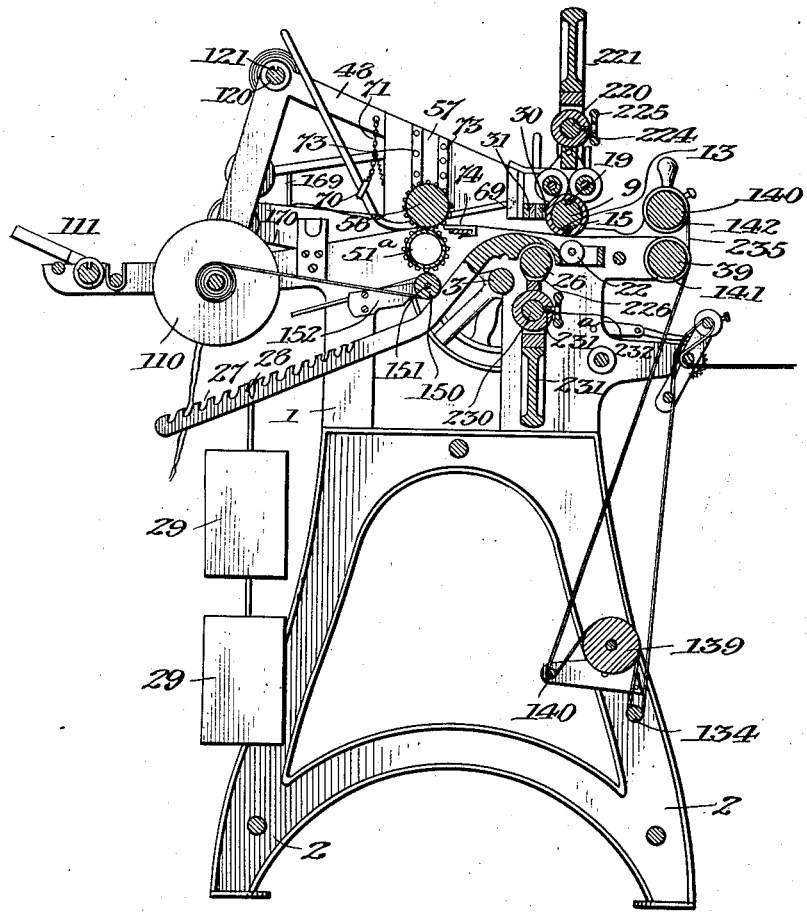
Figure 13:
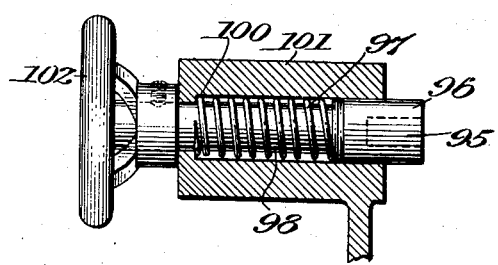
Figure 14:
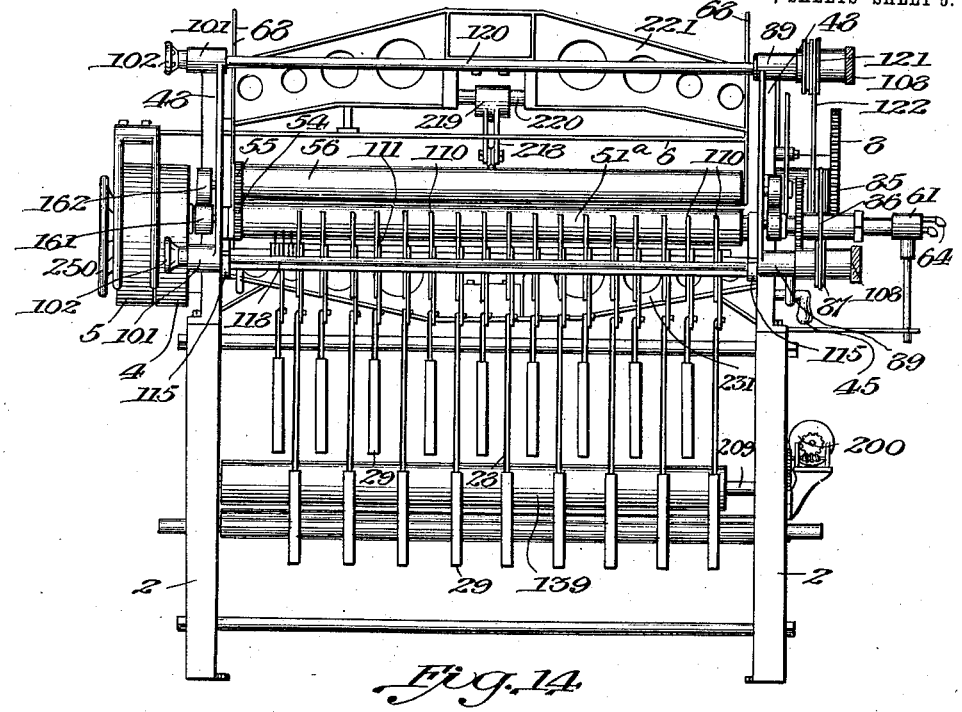
Figure 15:
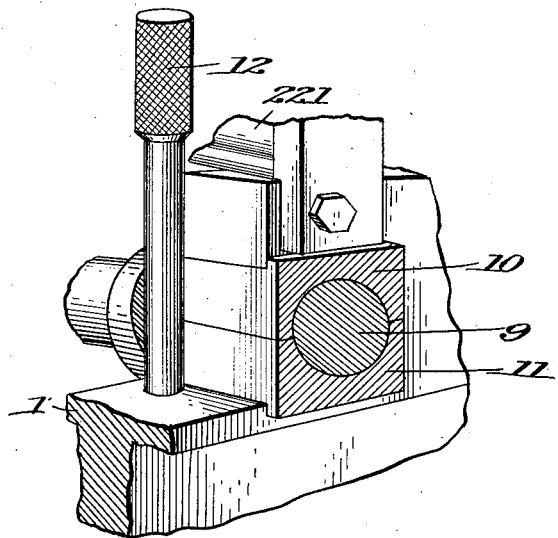
Figure 27:
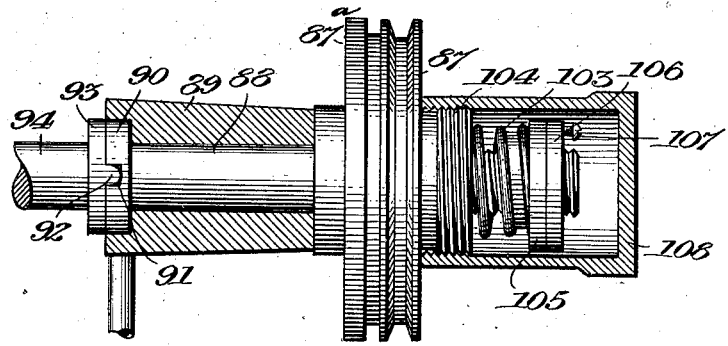
Figure 28:
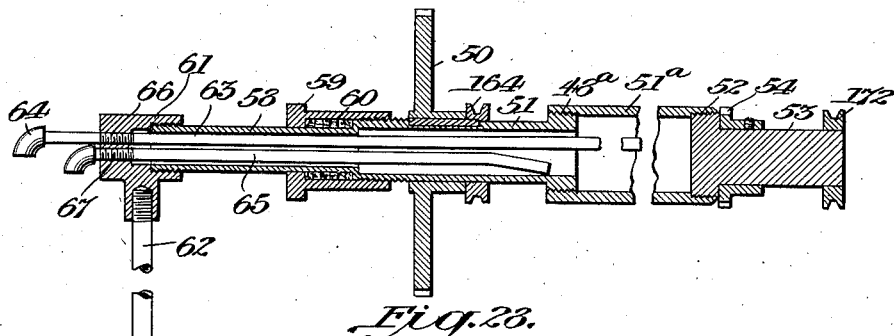
Figure 29:
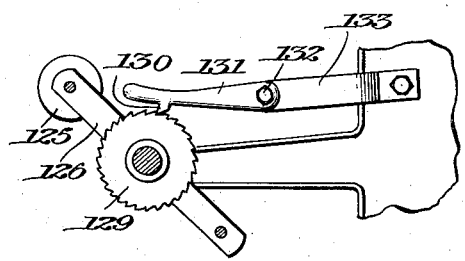
Figure 30:
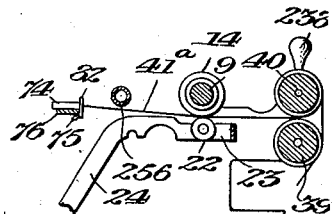

Other objects will appear by reference to the drawings in which:

Figure 1 is a rear end elevation of the machine; Fig. 2 is a detail view enlarged of a toggle employed on the machine; Fig. 3 is a detail enlarged of a cover used in connection with the folder; Fig. 4 is a detail enlarged of the folder; Fig. 5 is an end elevation of the folder illustrated in Fig. 4; Fig. 6 is a side elevation of the machine; Fig. 7 is a detail enlarged showing a plan view of the measuring device, from the rear; Fig. 8 is a detail enlarged of a bolt and handle employed; Fig. 9 is a side elevation, looking in the opposite direction from that in Fig. 6; Fig. 10 is a detail enlarged of a gage employed in adjusting the lateral position of the knives used on the machine; Fig. 11 is a detail enlarged of a knife employed; Fig. 12 is a central vertical section in elevation taken on the line 12—12 of Fig. 16; Fig. 13 is a detail enlarged of a bearing for detachably holding a spindle; Fig. 14 is an end elevation of the machine, looking in the opposite direction from that in Fig. 1; Fig. 15 is a detail enlarged of a bearing for holding the shaft upon which the knives are mounted, correlated parts being shown in fragment; Fig. 16 is a plan view, looking down from above upon the machine; Fig. 17 is a detail enlarged, showing an end view of means for strengthening the middle portion of the shaft holding the knives; Fig. 18 is a detail enlarged, showing a partial section of a bearing adapted to hold the end of a roller; Fig. 19 is a detail view enlarged, partially in section showing a side elevation of the folders; Fig. 20 is a detail enlarged of a bracket employed to protect certain gears; Fig. 21 is a detail enlarged, showing a perspective view of a sector member employed to mount certain gears; Fig. 22 is a detail enlarged, showing a side elevation of the device illustrated in Fig. 17; Fig. 23 is a detail enlarged, showing a perspective view of the folders mounted upon their support; Fig. 24 is a detail enlarged, showing a side elevation of a device for supporting a certain threaded shaft adapted to hold or mount the toggles; Fig. 25 is a detail enlarged, showing a perspective view of an eccentric bearing; Fig. 26 is a fragmentary detail enlarged, showing a plan view of the folders slightly modified; Fig. 27 is a detail enlarged, showing a central vertical section of a tension device, parts being illustrated in elevation; Fig. 28 is an enlarged detail, showing a central vertical section of a hollow shaft adapted to admit steam, and of the correlated parts; Fig. 29 is a fragmentary detail enlarged, showing a means for adjustably holding a tension device employed on the machine. Fig. 30, is a fragmentary view partly in section of a circular knife and correlated parts, showing a modification.

Referring to the figures in a more detailed description thereof, the frame of the machine is represented by —1— and has suitable standards —2—. Said frame —1— supports a master shaft 3, which is revolved by means of a tight pulley 4 connected by a belt to a power pulley not shown. Shaft 3 also supports a loose pulley 5 to which the aforesaid belt may be shifted by a belt shifter 6. At the opposite end of shaft 3 there is mounted a pinion 7 meshing with spur gear 8 rigidly secured to a shaft 9 removably supported in frame —1— by journal boxes comprising upper and lower members 10 and 11 respectively. Said boxes are held in assembled position by pins 12—12 removably mounted in suitable bores in frame —1—.

Shaft 9 is provided with a key seat 13 and has mounted thereon a plurality of circular knives 14 adapted to be keyed to shaft 9 by key 15 and key ways 16 in knives 14. Knives 14 may be disposed along shaft 9 at any given distance apart by the employment of gages 17 having shoulders 18—18 in each instance, which shoulders and the adjacent part of the gages are adapted to be housed in a second key-seat 19 upon shaft 9. Part 20 of gages 17 abut against the sides 21 of the circular knives 14, whereby to determine their relative longitudinal position along shaft 9.

Wheels 22 bear from beneath against the edges of knives 14 and are journaled in the bifurcated portions 23 of the upper portion of toggles 24, which are provided with screw threaded hemispherical parts 25 adapted to permit the said toggles to be disposed at any given position along stationary screw threaded bar or shaft 26 whereby to aline wheels 22 with the disposition of knives 14 upon shaft 9. The lower parts of toggles 24 are recessed in a plurality of places, as at 27, whereby hooks 28 suspending weights 29 may be variably held with reference to the degree of pressure required of wheels 22 against knives 14, to cut the cloth that is passed therebetween. By referring to Fig. 1 it will be observed that every other weight 29 is suspended by a long rod, for convenience of disposition.

Knives 14 are kept clear of any lint or other foreign matter by brushes 30 secured to bar 31 held in position at either end by adjustable brackets 32—32 secured to frame —1— of the machine. Pinion 33— is keyed to shaft 9 and is adapted to actuate the following train of gears 34, 35 and 36 mounted upon sector member 34ᵃ and the reduced end of shaft 39 respectively. Sector member 34ᵃ is provided with a hole 37 whereby same is fulcrumed upon the extended reduced end 38 of shaft 39. The remote end of sector member 34ᵃ has a sector slot 40ᵃ adapted to be engaged by a bolt 41 screw threaded into portion 42 of frame —1— and having a boss or washer 43 to engage the outer surface of the sector member and a boss 44 to be disposed between the sector member 34ᵃ and the adjacent surface of portion 42 of frame —1— and a handle 45, whereby said bolt 41 may be turned to hold sector member 34ᵃ in the position shown in Fig. 9, so that gears 34 and 35 mounted on studs projecting from sector member 34ᵃ and gear 36 keyed to the extended reduced end portion 38 of shaft 39 may be in position to be operated by pinion 33 keyed to shaft 9. Pinion 7 is also in mesh with pinion 46 pivotally mounted to adjustable bracket 47 secured to arm 48 of frame —1— by any suitable means as a bolt and nut 49. Pinion 46 is in mesh with spur gear 50 keyed to hollow union member 51 screw threaded as at 48ᵃ to hollow shaft 51ᵃ remotely threaded at 52 to shaft 53 journaled in a bearing in frame —1—. Shaft 53 has keyed thereon spur gear 54 normally in mesh with gear 55 keyed to shaft 56 having reduced ends adapted to be journaled in ways 57—57 formed at either side in frame —1—.

Hollow joint or union 51 is connected to hollow extension member 58 by a gland 59 holding packing 60. There is screw mounted to the outmost end of member 58 an elbow 61, which may be additionally supported by a rod 62. Steam is admitted to hollow shaft 51ᵃ by pipe 63 which may be connected at 64 to any source of steam supply. The exhaust is permitted to escape through pipe 65. Pipes 63 and 65 may be threaded to elbow 61 as at 66 and 67 respectively.

Shaft 56 is adapted to be raised up off from hollow shaft 53 against which it normally bears by manipulating levers 68—68 pivotally secured to the frame —1— at 69—69. When levers 68 are journaled upon their fulcrums 69, shaft 56 against whose reduced ends, levers 68 bear, is raised in guide ways 57—57. The levers and shaft 56 may be sustained in any adjustable elevated position within the limits of ways 57 by inserting pins 70 secured to chains 71—71, held to parts 48—48 of frame 1 at 72, into any one of the plurality of holes 73 on either side.

In front of the line of meeting of hollow shaft 51ᵃ and shaft 56 is disposed a plurality of folders 74 having lower members 75, bent outwardly at their free ends and adapted to straddle bar 76, whereby to be secured in assembled position. By referring to Fig. 23, it will be noticed that every other folder 74 has one end elevated above the ends of the adjacent folders 74, by means of blocks 78 secured to bar 76, so that any stray threads due to cutting of the cloth 41ᵃ will not get caught between the upturned edges 79—79 of folders 74. The upturned edges 79 of folders 74 are bent to form overhanging edges 80—80 adapted to provide slide ways for detachable covers 81 having upturned ends 82 for convenience of manipulation. Further folders 74 converge from end 83 toward end 84, so that the strips of cloth, as same pass therethrough, will have their respective edges turned or folded over. There is also keyed to master shaft 3 a double flanged pulley 85 upon one side of which, a belt 86 connects with a flanged pulley 87 loosely mounted on shaft 88 and abutting against hub 87a keyed to shaft 88, journaled in bearing 89 integral with frame —1— of the machine. Shaft 88 is provided with head 90 having recess 91 adapted to receive the corresponding projection 92 of head 93 integral with removable spindle 94. The remote end of spindle 94 is provided with a reduced end adapted to be detachably received by socket 95 of head 96 held normally outward by coiled spring 97 disposed about the shank 98 and bearing at one end against head 96 and remotely against shoulder 100 of bearing 101. Head 96 may be pulled inward against the tension of spring 97, whereby to release the end of spindle 94, by handle 102.

In order to regulate the velocity of revolution of spindle 94, when the machine is in operation, there is provided a tension device comprising a coiled spring 103 held at one end against washer or boss 104 integral with pulley 87, loosely mounted upon the outer end of shaft 88. Said spring 103 bears at the other end against disk 105 screw threaded to shaft 88, and lies adjacent corresponding disk 106 screw threaded to the end of shaft 88. Disks 105 and 106 are held at any given degree of turn upon shaft 88 by a set screw 107, mounted in disk 106 and bearing against disk 105. This tension device is inclosed by cap or cover 108 screw mounted to boss 104.

Upon spindle 94 there is loosely mounted a plurality of disks 110 which may be held at given distances apart to correspond with the distances of cutters 14 by arms 111 having hubs 112 pivotally mounted upon shaft 113 having bearings at 114—114 in brackets 115—115 secured to frame —1—. Arms 111 may be thrown back away from engagement of disks 110 by rod 116 loosely held in open bearings 117—117 in brackets 115—115 of frame —1—. When arms 111 are thrown back away from disks 110, they rest against rod 118 held in open bearings 119—119 of brackets 115—115 secured to frame —1—, whereby the lifting of rod 118 will throw arms 111 in the reverse position. Almost directly above disk carrying spindle 94, is another spindle 120 detachably mounted in the same manner as spindle 94 and adapted to carry in the same manner a plurality of disks such as 110. Spindle 120 may be revolved by its intermediate connection with flanged pulley 121 connected by belt 122 with double flanged pulley 85 keyed to master shaft 3.

The operation of the machine is substantially as follows: The cloth 41a is passed through first a tension device comprising three bars 123, 124, and 125 secured to end bars 126 and 127. Middle bar 124 is elongated whereby to form pivotal supports for the device in bearings 128 formed in portions 42—42 of frame —1— and has keyed adjacent one end a ratchet wheel 129 engaged by tooth 130 of pawl 131 pivotally connected at 132 to bracket 133 secured to frame —1—, whereby said tension device may be held at any given angle with reference to the desired tension. Cloth 41a passes from the tension device down under roller 134 having bearings in the standards of frame —1—; up over roller 139, down under roller 140, having bearings in brackets secured to standards of frame —1—, up between feed rollers 39 and 40 which are preferably covered with felt cloth 141 and 142 respectively, between rollers 22 and knives 14, where the cloth is cut into a plurality of strips in accordance with the disposition of knives 14, to folders 74, which turn under and fold down the respective edges of the strips and pass same on between hollow shaft 51a and shaft 56, which bears thereon and is fluted, whereby the folded strips are pressed by reason of the steam passing through hollow shaft 51a. In order that the strips of cloth may be held in contact with the hot surface of roller 51a for a partial turn thereof, there is provided another roller 150 mounted to detachable spindle 151, whose ends are mounted in bearings 152 secured to frame —1— of the machine. Bearings 152 pivotally support a tongue 153 having an extended handle 154 and bearing portion 155, held in normal position by spring 156 secured at one end in a recess 157 in the bottom of bearing 152.

Spindle 151 upon which roller 150 is mounted may be easily removed by bearing down on handles 154—154 of bearings 152 at either side of frame —1— or be disposed back in position by pushing roller 150 under roller 51a, whereby the respective ends of spindle 151 will ride up over tongues 153 and thereby depress same against the tension of springs 156 until said ends of the spindle 151 move into recesses 158 of bearings 152 and thereby permit said tongues 153 to rise under the influence of springs 156 and lock spindle 151 and roller 150 mounted thereon is assembled position.

The strips of cloth are then wound about spindle 94 and between disks 110, which as stated may be held in correct position by arms 111. The said arms 111, however, are afterward thrown back into the position shown in Figs. 9 and 12 by lifting rod 116, immediately the strips of cloth have been rolled sufficiently upon spindle 94 to maintain disks 110 in position. Spindle 94 may be replaced by another, when sufficient of the strips have been wound thereon. In the event that the strips are passed through the machine without being folded, their width, together with that of disks 110 will not permit same to be rolled entirely upon spindle 94, to compensate for which, every other strip may be rolled upon spindle 120 almost directly above spindle 94.

The selvage 160—160 of cloth 41ª is taken care of by rollers 161—162 disposed in pairs on the outside of frame —1— on either side of the machine. Roller 161 is revolved by a belt 163 connecting a flanged pulley integral with said roller 161 and with a flanged pulley 164 keyed to shaft 51. The upper selvage pulley 162 is journaled upon an axle 165 secured to arm or lever 166 fulcrumed at 167 and held in downward position, whereby upper selvage roller 162 bears upon lower selvage roller 161, by a coiled spring 168. There is disposed in front of selvage rollers 161 and 162 an elbow bracket 169 adapted to guide the selvage to the rollers 161 and 162. Selvage roller 161 at the opposite side of the machine, or on the side on which pulleys 4 and 5 are located, is revolved by a belt 170 connecting a pulley 171 integral with pulley 161 and a pulley 172 keyed to shaft 53. When the machine is first started the cloth is passed about the respective rollers mentioned and between cutters 14 and rollers 22, until sufficient length of strips of cloth is obtained to dispose said strips through folders 74, whose covers 81 are removed for the purpose and along its remaining course to spindle 94.

The machine embodies a device for indicating at any moment the exact amount or length of cloth 41ª that has been fed thereto. Said device comprises a graduated dial 200 supported to the outside of one of standards 2 of frame —1— by a bracket 201. An indicator finger or hand 202 is actuated around the dial face 200 by a stud 203 mounted in dial 200, whereby to indicate with reference to the figures of the dial 200, the length of cloth that has passed over roller 139. Stud 203 supports at its opposite end a gear 204 in mesh with a worm 205 supported in bearings 206—206 secured to the under surface of dial 200 and having keyed at one end a spur gear 207 in mesh with a pinion 208 keyed to the extended reduced end 209 of roller 139. The cloth 41ª is fed to the machine and run through the various stages described by the revolution of the rollers actuated by master shaft 3 in the manner heretofore described. Shaft 113 is provided with key way 210 to receive suitable gages whereby to hold arms 111 at the proper distance apart in accordance with the distance of knives 14, however, said arms 111 will serve their function without the use of such gages. The central portion of shaft 9 holding knives 14 is braced by circumferential grooved wheels 215—215 journaled on axles 216—216 supported in brackets 217—217 pivotally connected to links 218—218 integral with sleeves 219 pivotally mounted to shaft 220 secured to upper portion 221 of frame —1—. The outer flanged portions 222—222 of wheels 215 bear upon the lateral peripheral surfaces 223—223 of knives 14. Sleeve 219 may be held at any given angle upon shaft 220 by set screw 224 having hand member 225. Likewise, stationary screw threaded shaft 26 may be supported centrally thereof by screw threaded semicircular member 226 secured to block 227 pivotally held to links 228—228 integral with sleeve 229 pivotally mounted to shaft 230 secured to part 231 of frame —1— of the machine. Sleeve 229 may be held at any given degree of angle to shaft 230 by a set screw 231ª having hand member 232.

In the event that it is found desirable to raise roller or shaft 40 up off from feed roller or shaft 39, there is provided means for so doing. Said means embodies eccentric bearings 233—233 housed in bearings 234—234 formed in brackets 235—235 integral with frame —1—. Said eccentric bearings 233 have elongated apertures 237 for the reception of the reduced ends of shaft 40 and are also provided with handles 238—238, whereby to revolve same and thereby elevate or lower shaft 40 with reference to shaft 39. Shaft 9 mounting knives 14 may be removed from the machine, whereby to alter the position of knives 14 by first withdrawing gear 34 from mesh with pinion 33ª keyed to shaft 9. This may be effected by turning handle 45 of bolt 41 and thereby releasing sector member 34ª so that same may be journaled upon its fulcrum by handle 237. Pins 12—12 may then be withdrawn from their bores in frame —1— and the bearings supporting shaft 9 removed. Gears 34, 35 and 36 are protected by an over hang bracket 239 secured in any suitable manner to the top of sector member 34ª.

In Figs. 19 and 26 there is shown a certain modification of folders 74, embodying additional means for preventing the threads of the strips of cloth as evolved from between knives 14 and rollers 22, from catching between the edges 79 of folders 74 by making every folder 74 of additional length. The machine may be moved slowly by turning hand wheel 250 keyed to master shaft 3. However, when it is desired to throw the belt onto the tight pulley 4 to operate the machine, it is merely necessary to manipulate either handle 251 or 252 of belt shifter 6. Gear 7 may be protected by a circular guard secured to the outer end of master shaft 3.

In Fig. 30, there is shown a certain modification of construction embodying a steam pipe 255 having small apertures 256 for the passage of steam, and disposed in the line of movement of cloth 41ª, just in front of folders 74, whereby said cloth 41ª is moistened by the condensed steam, so as to be properly ironed when brought over steam hollow shaft 51ª.

Having thus described my invention, what I claim as new and desire to secure by Letters Patent is:

1. In a cutting and winding machine, the combination of a plurality of circular knives, a plurality of wheels adapted to bear against said knives for cutting a fabric into strips, gages for regulating the lateral distance between said knives, steam means for pressing said strips, as same are evolved from said knives, means for winding said strips, feed rollers and eccentric means for raising one of said feed rollers off from the other.

2. In a cutting and winding machine, the combination of a plurality of circular knives, a plurality of wheels adapted to bear against the edges of said knives for cutting a fabric into strips, gages for regulating the lateral distance between said knives, adjustable weights for increasing or decreasing the tension of said wheels against the edges of said knives, means for pressing said fabric, feed rollers and eccentric bearings having elongated apertures and handles, whereby to elevate one of said feed rollers, substantially as described.

3. In a cutting and winding machine, the combination of a plurality of knives for cutting a fabric, gages having shoulders for regulating the lateral distance between said knives, a plurality of wheels adapted to bear against the edges of said knives, weights for regulating the tension of said wheels against said knives, steam means for pressing said fabric, a spindle upon which said fabric, after being cut into strips, is wound, and means for detachably holding said spindle in assembled position on said machine.

4. In a cutting and winding machine, the combination of a plurality of knives for cutting a fabric into strips, a plurality of wheels adapted to bear against the edges of said knives, gages having shoulders for regulating the lateral disposition of said wheels, weights for regulating the degree of pressure of said wheels against said knives, a fluted steam pipe for pressing said strips of fabric, a spindle upon which said strips are wound, and means for detachably securing said spindle in assembled position upon said machine.

5. In a cutting and winding machine, the combination of a plurality of knives, wheels adapted to bear against the edges of said knives, whereby said knives will cut a fabric passed between said knives and said wheels, weights for regulating the degree of pressure of said wheels against said knives, a spindle for winding the cut strips of fabric, as same come from said knives, steam means for pressing said strips, means for separating said strips, and means for detachably securing said spindle in assembled position.

6. In a cutting and winding machine of the character described, the combination of a plurality of knives, gages for adjusting the distance between said knives, a plurality of wheels coöperating with said knives, whereby to cut a fabric into strips passed therebetween, weights for regulating the degree of pressure of said wheels against said knives, means for winding said fabric, as same is evolved from said knives, steam means for pressing said strips, and means for detachably securing said means for winding said strips of fabric, in assembled position upon said machine.

7. In a cutting and winding machine, the combination of a plurality of circular knives, gages for adjusting the distance between said knives, a plurality of wheels adapted to bear against the edges of said knives, whereby to cut a fabric into strips, passed therebetween, said wheels mounted on toggles, recesses in said toggles for holding adjustable weights, whereby the degree of pressure of said wheels against said knives may be regulated, means for winding said strips of fabric, as same come from said knives, steam means for pressing said strips, and means for detachably holding in assembled position, the means for winding said strips.

8. In a cutting and winding machine, the combination of a shaft, a plurality of knives for cutting a fabric into strips mounted on said shaft, gages for regulating the distance between said knives, a plurality of wheels adapted to bear against the edges of said knives, toggles for mounting said wheels, adjustable means detachably connected to said toggles, whereby the degree of pressure of said wheels against said knives may be regulated, a spindle for winding said strips of fabric, as same come from said knives, steam means for pressing said strips, and means for detachably securing said spindle in assembled position upon said machine.

9. In a cutting and winding machine, the combination of a frame, a shaft, bearings for journaling said shaft, pins for detaching said bearings from the frame of the machine, a plurality of knives mounted on said shaft, a plurality of wheels bearing against the edges of said knives, whereby to cut a fabric passed between said knives and said wheels, and means for regulating the degree of pressure of said wheels against said knives.

10. In a cutting and winding machine, the combination of a plurality of knives, mounted upon a shaft, means for detaching said shaft from its bearings, a plurality of wheels bearing against the edges of said knives, whereby to cut a fabric passed therebetween, into strips, means for regulating the degree of pressure of said wheels against said knives, means for winding said strips of fabric, steam means for pressing said strips of fabric, means for separating said strips, and means for detachably securing said means for winding said strips of fabric, in assembled position upon said machine.

11. In a cutting and winding machine, the combination of a plurality of circular knives, toggles for mounting said knives, screw threaded hemispherical parts on said toggles, whereby said toggles may be adjustably disposed in a lateral manner, wheels bearing against the edges of said knives, whereby to cut a fabric into strips passed therebetween, adjustable weights for increasing or decreasing the tension of said wheels against the edges of said knives, a steam pipe for moistening said fabric and a steam pipe for pressing said fabric cut into strips.

12. In a cutting and winding machine, the combination of a plurality of knives, means bearing against the edges of said knives, whereby to cut a fabric into strips, adjustable weights for regulating the tension of said wheels against said knives, means for winding said strips, and disks for separating said strips while being wound.

13. In a cutting and winding machine, the combination of a plurality of circular knives, gages for regulating the lateral distance between said knives, a plurality of wheels adapted to bear against the edges of said knives, weights for regulating the tension of said wheels against said knives, disks for separating the strips of fabric, as cut by said knives, and arms for holding said disks at given intervals apart.

14. In a cutting and winding machine, the combination of a plurality of knives, means bearing against the edges of said knives, whereby to cut a fabric passed therebetween, adjustable weights for regulating the tension of said wheels against said knives, disks for separating the strips of fabric, while being wound, arms for holding said disks at given intervals apart, and means for holding said arms at given intervals apart.

15. In a cutting and winding machine of the character described, the combination of a plurality of knives, wheels bearing against the edges of said knives, whereby to cut a fabric passed therebetween, adjustable weights for regulating the tension of said wheels against said knives, disks for separating the strips of fabric, while being wound, arms for holding said disks at given intervals apart, gages for holding said arms at given intervals apart, and a bar for throwing said arms away from engagement with said disks.

16. In a cutting and winding machine, the combination of a plurality of knives, wheels bearing against the edges of said knives, whereby to cut a fabric into strips, adjustable weights for regulating the tension of said wheels against said knives, disks for separating the strips of fabric, while being wound, arms for holding said disks at given intervals apart, gages for holding said arms at given intervals apart, bars for throwing said arms into and away from contact with said disks.

17. In a cutting and winding machine, the combination of a plurality of knives, wheels bearing against the edges of said knives, whereby to cut a fabric into strips, adjustable weights for regulating the tension of said wheels against said knives, a tension device, a ratchet wheel and pawl for holding said tension device at any given angle whereby to adjust the tension of the fabric, as passed to said knives, and means for winding said strips in separate folds upon a spindle.

18. In a cutting and winding machine, the combination of a plurality of knives, wheels bearing against the edges of said knives, whereby to cut a fabric into strips, adjustable weights for regulating the tension of said wheels against said knives, disks for separating the strips of fabric, while being wound upon a spindle, and said spindle having a head and projection at one end and a reduced portion at the opposite end, whereby same may be detachably held in position.

19. In a cutting and winding machine, the combination of a plurality of knives, wheels bearing against the edges of said knives, whereby to cut a fabric into strips, adjustable weights for regulating the tension of said wheels against said knives, a spindle upon which said strips are wound, a shaft having a recess adapted to engage one end of said spindle, and a socket in a head held normally outward by a coiled spring for engaging the opposite end of said spindle, whereby said spindle may be detached from the machine.

20. In a cutting and winding machine, the combination of a plurality of knives, wheels bearing against the edges of said knives, whereby to cut a fabric into strips, adjustable weights for regulating the tension of said wheels against the edges of said knives, means for measuring said fabric, while passing through the machine, a hollow shaft adapted for the admission of steam for pressing said fabric, a shaft bearing on said hollow shaft, levers for raising said shaft off from bearing on said hollow shaft, and pins for holding said shaft and levers in elevated position.

21. In a cutting and winding machine, the combination of a plurality of circular knives, a plurality of wheels adapted to bear against said knives for cutting a fabric into strips, gages for regulating the lateral distance between said knives, steam means for pressing said strips, a roller for holding said strips against said steam means, means for detachably holding said last named roller in place, and means for winding said strips.

22. In a cutting and winding machine, the combination of a plurality of circular knives, a plurality of wheels adapted to bear against said knives for cutting a fabric into strips, steam means for pressing said strips, as same are evolved from said rollers and knives, a roller for holding said strips in contact with said steam means, said roller mounted upon a spindle, and bearings for supporting the ends of said spindle, said bearings comprising tongues having extended handles, and springs for holding said tongues in normal position.

In witness whereof I have hereunto affixed my signature this 2d day of May, 1912.

JOSEPH A. FIRSCHING.

Witnesses:
DAVID B. LISLE,
SAMUEL SLOAN.